United States Patent [19]

Hart

[11] Patent Number: 4,567,783
[45] Date of Patent: Feb. 4, 1986

[54] MULTI-ANGLE PINION AND GEAR POWER TRANSMISSION

[75] Inventor: Frederick M. Hart, Williamsburg, Mich.

[73] Assignee: Ex-Cell-O Corporation, Troy, Mich.

[21] Appl. No.: 466,260

[22] Filed: Feb. 14, 1983

[51] Int. Cl.[4] .......................... F16H 1/16; F16H 1/20; F16H 37/06; F16H 1/12

[52] U.S. Cl. ...................... 74/425; 74/416; 74/724; 74/665 H; 74/425.5

[58] Field of Search ............. 74/425, 665 F, 665 GB, 74/665 GD, 417, 416, 420, 425.5, 665 H, 724

[56] References Cited

U.S. PATENT DOCUMENTS

| | | | |
|---|---|---|---|
| 1,269,752 | 6/1918 | Shelton | 74/665 GD |
| 1,338,377 | 4/1920 | Kopf | 74/425 |
| 1,343,005 | 6/1920 | Sauvage | 74/424 |
| 1,349,719 | 8/1920 | Gardiner | 74/425.5 |
| 1,378,318 | 5/1921 | Brewer | 74/424 |
| 1,519,895 | 12/1924 | Andrews | 74/425.5 |
| 1,641,692 | 9/1927 | Pratt | 74/425.5 |
| 1,696,253 | 12/1928 | Pinckney | 74/665 H |
| 1,710,855 | 4/1929 | Baker | 74/425.5 |
| 2,201,670 | 5/1940 | Kraus | 74/425 |
| 2,278,880 | 4/1942 | Ivy | 74/425.5 |
| 2,578,893 | 12/1951 | Massare et al. | 74/425.5 |
| 2,610,527 | 9/1952 | Papay | 74/424 |
| 2,622,453 | 12/1952 | Garnier | 74/665 S |
| 2,755,686 | 7/1956 | Bade | 74/665 H |
| 2,756,641 | 7/1956 | Skog | 409/39 |
| 2,806,386 | 9/1957 | Andrew | 74/424 |
| 3,017,784 | 1/1962 | Monaghan | 74/425 |
| 3,081,646 | 3/1963 | Skrupky | 74/665 H |
| 3,554,044 | 1/1971 | Hoglund | 74/665 GD |

FOREIGN PATENT DOCUMENTS

| | | | |
|---|---|---|---|
| 56317 | 5/1891 | Fed. Rep. of Germany | 74/425 |
| 363693 | 11/1922 | Fed. Rep. of Germany | 74/665 H |
| 543538 | 1/1932 | Fed. Rep. of Germany | 74/665 GD |
| 2108508 | 9/1971 | Fed. Rep. of Germany | 74/425 |
| 2146247 | 9/1971 | Fed. Rep. of Germany | 74/665 GD |
| 918920 | 8/1945 | France | 74/424 |
| 46352 | 8/1961 | Poland | 74/417 |
| 566498 | 9/1975 | Switzerland | 74/425 |
| 3437 | of 1911 | United Kingdom | 74/425.5 |

OTHER PUBLICATIONS

Raymond J. Drago, Fundamentals of Gear Design, 1982, pp. 3-35.

Primary Examiner—Lawrence J. Staab
Assistant Examiner—Michael D. Bednarek
Attorney, Agent, or Firm—John P. Moran

[57] ABSTRACT

A power transmission is disclosed, including a single input pinion or worm and multiple gears and output shafts associated therewith such that two of the latter shafts are at right angles to one another, or any other angle other than parallel. In an alternate embodiment, two worms are formed on one input shaft, with one or more gears meshing with each worm, producing multiple outputs at two different speeds.

3 Claims, 9 Drawing Figures

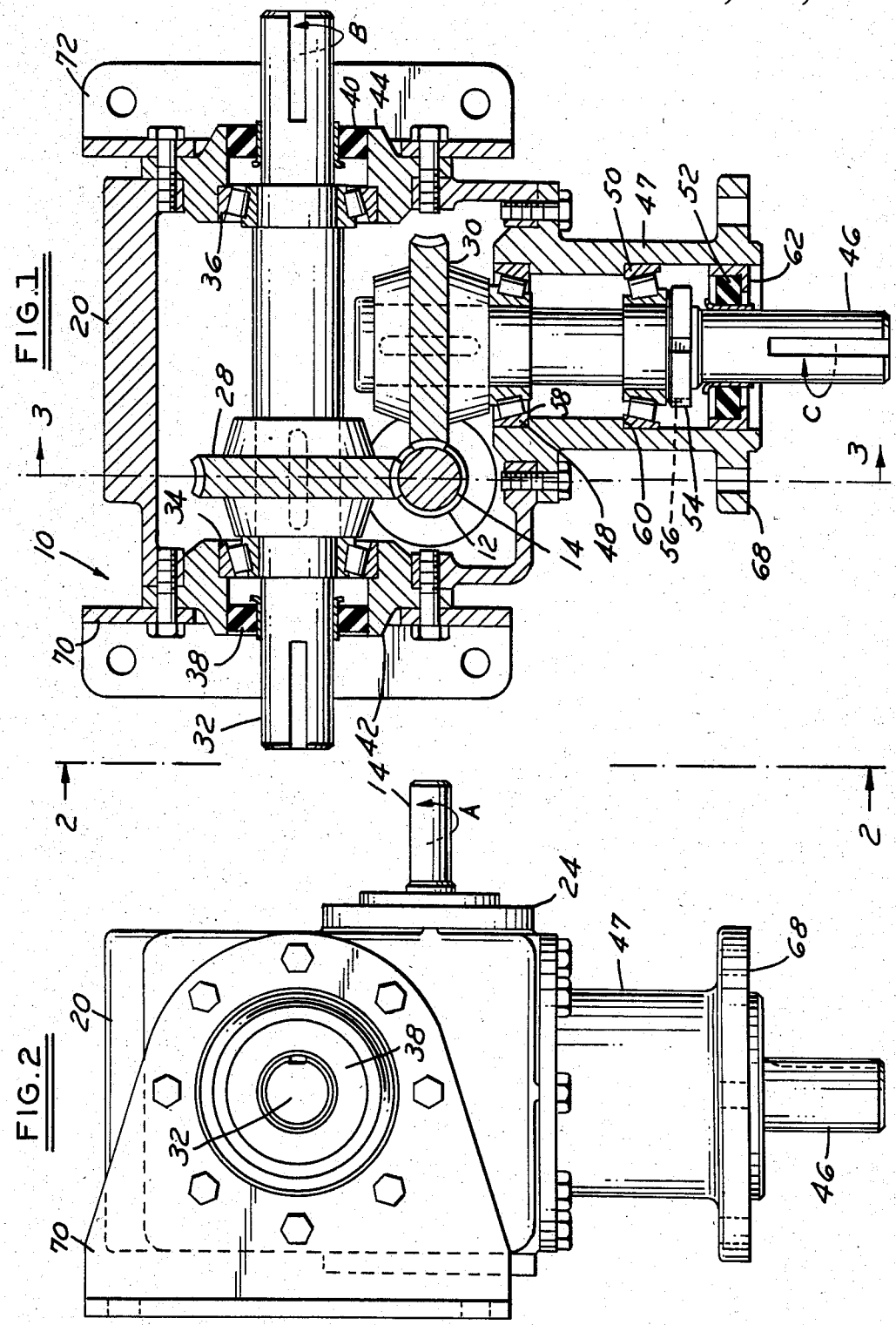

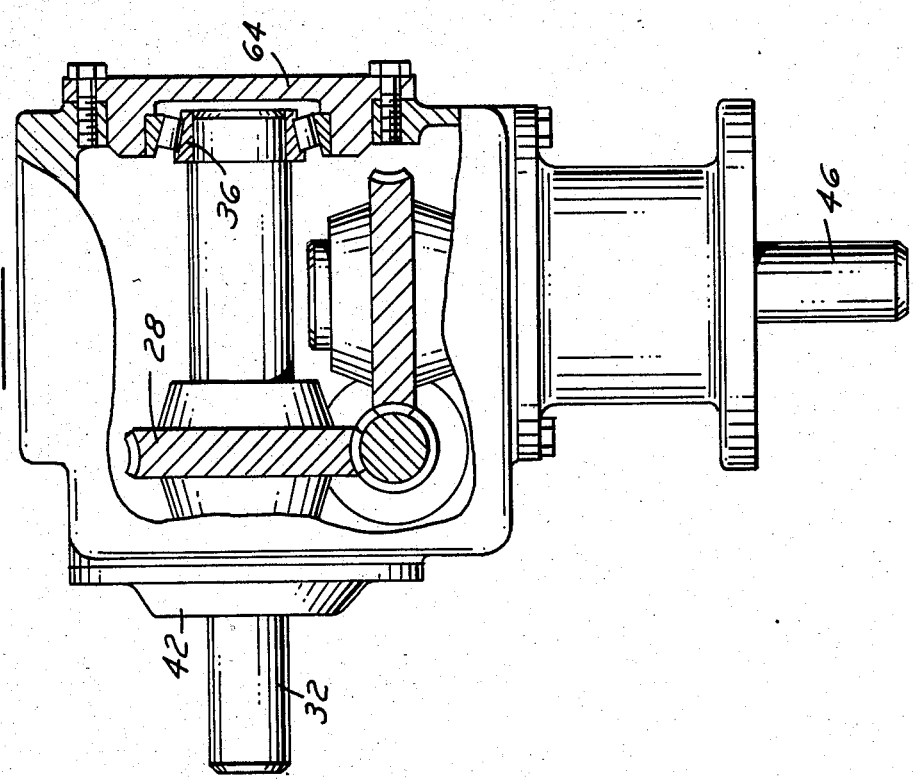
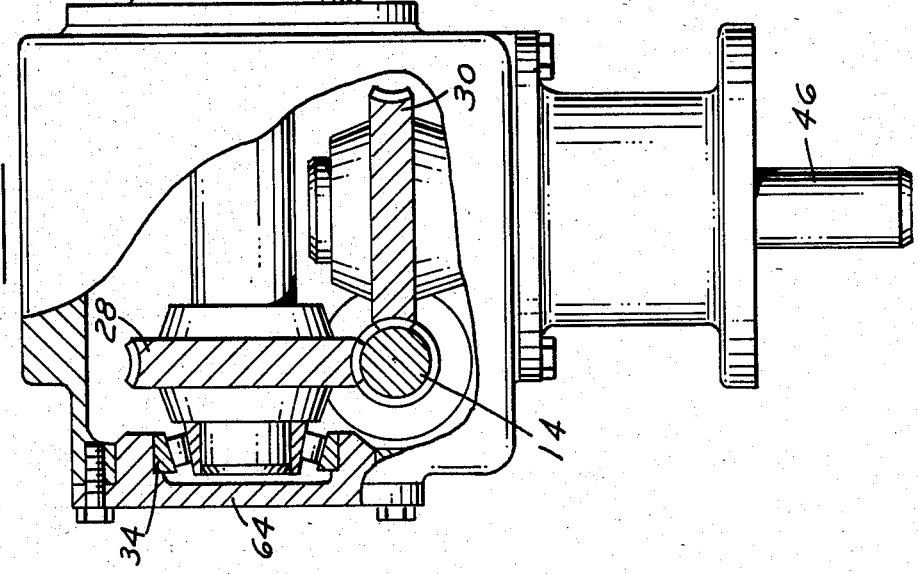

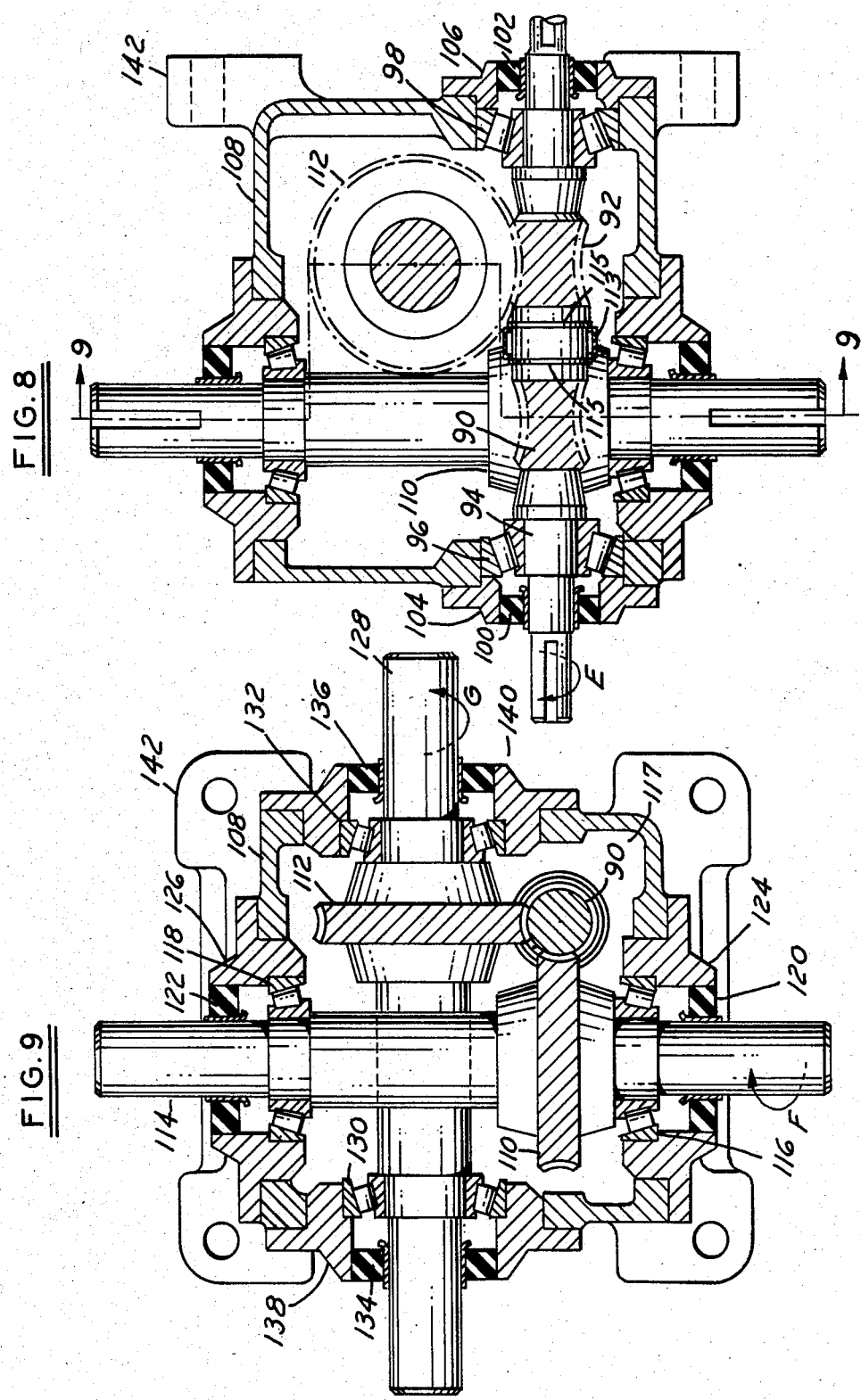

MULTI-ANGLE PINION AND GEAR POWER TRANSMISSION

This invention relates generally to power transmission and, more specifically, to such transmissions which embody a single input pinion or worm and multiple gears with multiple output shafts at various angles to one another other than being parallel.

BACKGROUND ART

Heretofore, multiple angled power take-off drive units have been used, embodying spiral bevel or hypoid gears, such as shown in Garnier U.S. Pat. No. 2,622,453 and Bade U.S. Pat. No. 2,755,686. Also known is the arrangement of one pinion or worm input with two gears spaced 180° apart thereon, resulting in parallel output shafts, and used specifically to pinch sheets of metal therebetween in an extruding application.

DISCLOSURE OF INVENTION

A general object of the invention is to provide an improved single input pinion or worm and multiple output gear power transmission wherein the output shafts may be arranged in relationships other than a parallel arrangement.

Another object of the invention is to provide such a power transmission wherein the worm and gears may be either the straight cylindrical types, or the globoidal or double enveloping types, such as shown and described in Skog U.S. Pat. No. 2,756,641.

A further object of the invention is to provide a power transmission wherein two double enveloping type gears are mounted at right angles on one double enveloping type worm to thus provide two right angled outputs.

Still another object of the invention is to provide a power transmission wherein outputs in addition to two such right angled outputs are feasible.

A still further object of the invention is to provide two worms of different ratios and/or right hand or left hand helixes formed on one input shaft, with one or more cooperating gears meshing with each worm to thus produce output shafts of different speeds and/or different directions of rotations.

These and other objects and advantages of the invention will be apparent when reference is made to the following description and accompanying drawings.

BRIEF DESCRIPTION OF THE DRAWINGS

FIG. 1 is a cross sectional view of a double enveloping type worm and gear power transmission embodying the invention;

FIG. 2 is an end view taken along the plane of the line 2—2 of FIG. 1, and looking in the direction of the arrows;

FIGS. 4–7 are fragmentary cross sectional views illustrating various possible modifications of portions of the FIG. 1 structure;

FIG. 8 is a cross sectional view of an alternate embodiment of the invention; and FIG. 9 is an end view taken along the plane of the line 9—9 of FIG. 8, and looking in the direction of the arrows.

BEST MODE OF CARRYING OUT THE INVENTION

Figure 3:
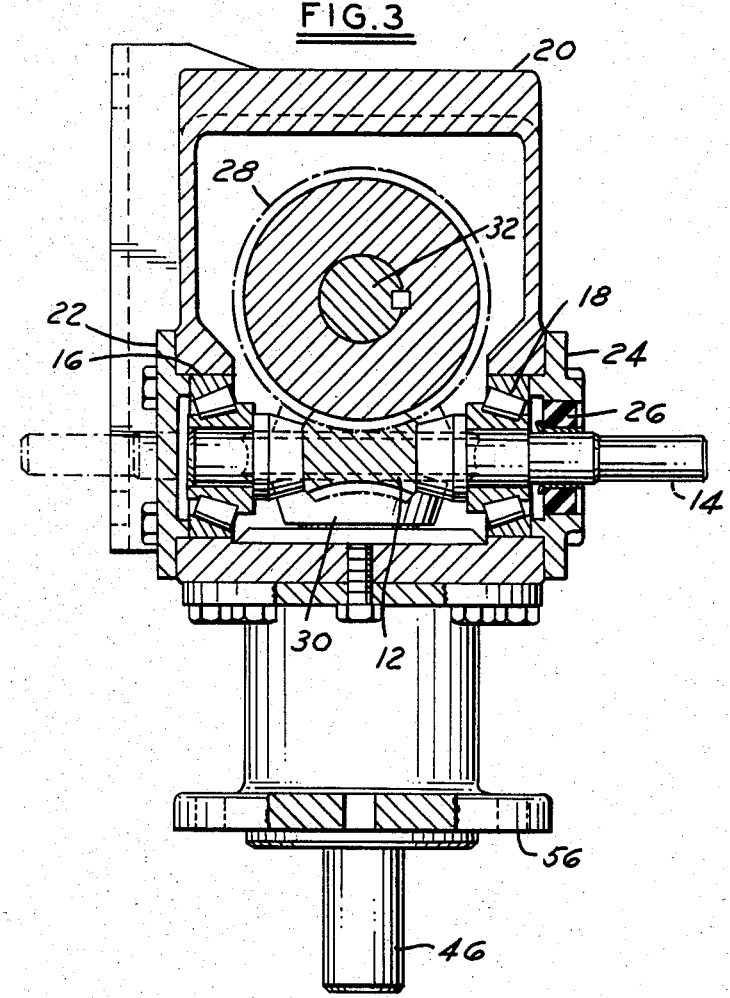
FIG. 3 is a cross sectional view taken along the plane of the line 3—3 of FIG. 1, and looking in the direction of the arrows.

Referring now to the drawings in greater detail, FIGS. 1 and 3 illustrate a worm and gear drive assembly 10 including a single double enveloping type worm or pinion 12 and associated shaft 14 rotatably mounted through bearings 16 and 18 in a suitable housing 20, and held in place therein at one end by a closed bearing cap 22, and at the other end by an open cap 24 and oil seal 26, with the shaft 14 being driven by external power means (not shown). If desired, the shaft 14 may be doubly extended, as shown in phantom in FIG. 3, in which case the closed cap 22 would be replaced by a second open cap 24 and oil seal 26.

A pair of double enveloping type gears 28 and 30 are mounted so as to mesh with the single worm 12 at right angles to one another. The gear 28 is mounted on an output shaft 32 extending in opposite directions from the housing 20 through respective bearings 34 and 36, and seals 38 and 40. The bearings and seals are retained in respective carriers 42 and 44. The gear 30 is mounted on an output shaft 46 extending in one direction only from the housing 20 through a bearing carrier housing 47 and, more specifically, through spaced bearings 48 and 50 and an outlet oil seal 52 in the carrier housing 47. The bearings 48 and 50 and, hence, the gear 30, are retained by a conventional locknut 54 and lock washer 56 against respective shoulders 58 and 60 formed in the carrier housing 47. The seal 52 is supported by a retainer 62.

If desired, the shaft 32, may extend from the housing 20 in only one selected direction from its gear 28, as shown in FIGS. 4 and 5. In this event, the shaft 32 would be shortened within the housing 20, and the open carrier 42 or 44, and the respective seals 38 or 40, replaced by a closed bearing carrier 64.

Figure 3A:
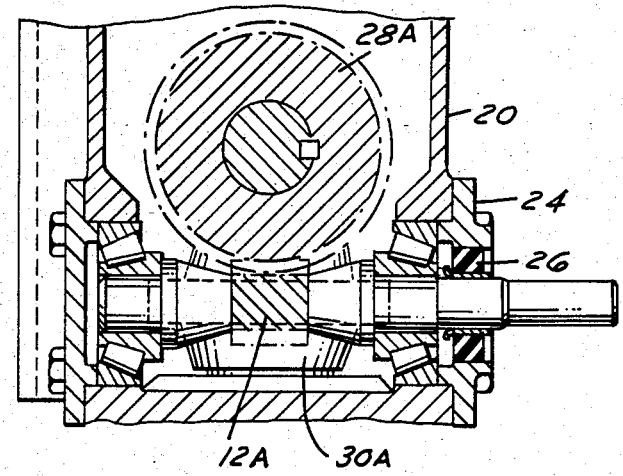
FIG. 3A is a fragmentary cross sectional view of a portion of the FIG. 3 structure illustrating a straight cylindrical worm and gear set in lieu of the double enveloping type worm and gear set shown in FIGS. 1 and 3.
Figure 6:
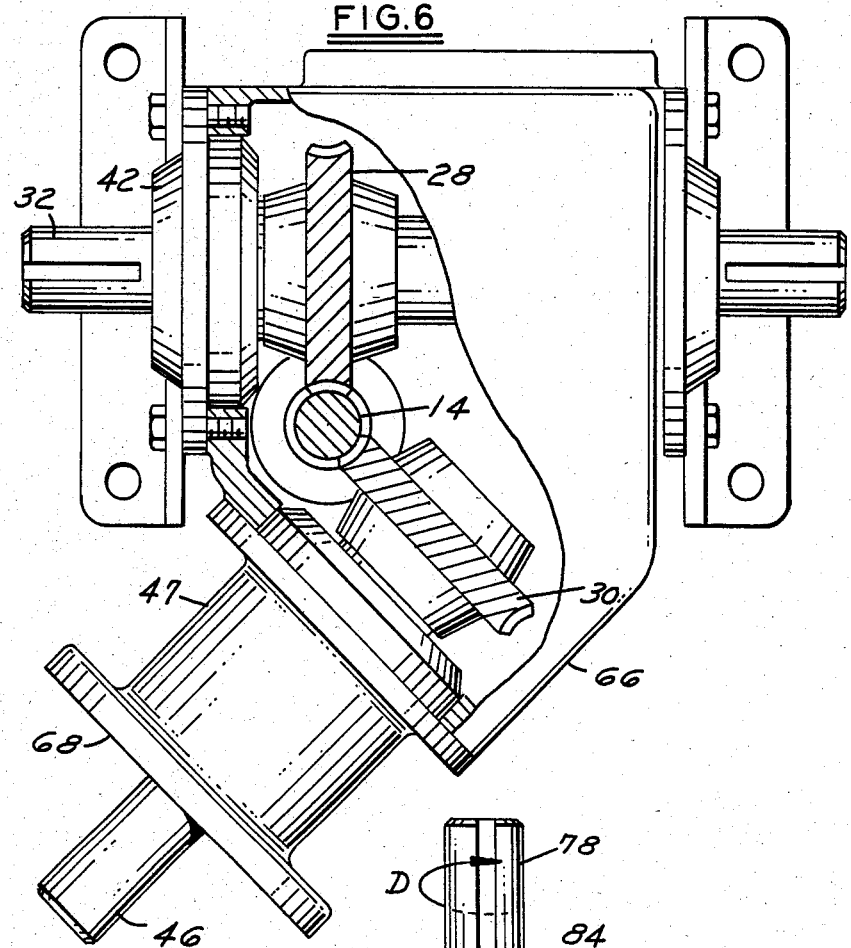

As illustrated in FIG. 3A, the worm 12 and double gears 28 and 30 may be straight cylindrical types 12A, 28A and 30A, respectively, rather than the double enveloping types shown in FIGS. 1 and 3. Furthermore, as illustrated in FIG. 6, the output shafts 32 and 46 of FIG. 1 may be operative at some angular relationship other than at right angles to each other. Various angles are possible, FIG. 6 showing one such angle. A suitable housing 66 serves to accommodate the desired angular relationship.

A round or square flange 68 formed on the housing 20 may be used to mount the assembly 10 on the floor, wall, or ceiling, as desired. As shown in FIGS. 1 and 2, as an alternative to the flange 68, a pair of brackets 70 and 72 may be employed to provide for the floor, wall or ceiling mounting.

Figure 7:
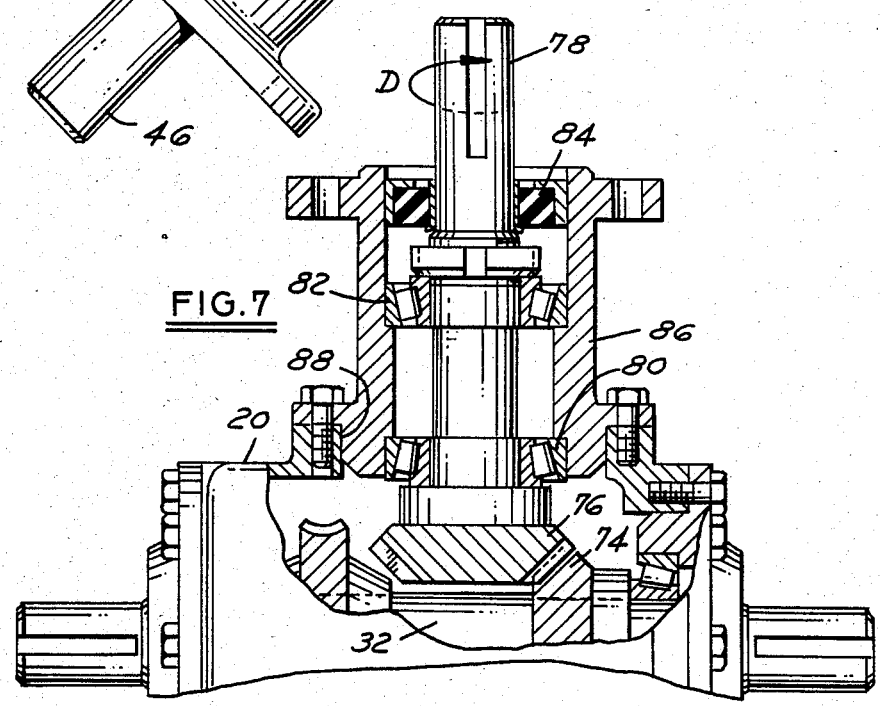

Referring now to FIG. 7, it may be noted that an additional output is possible by virtue of mounting a plain bevel or a spiral bevel gear 74, for example, on the shaft 32, and adding an additional similar bevel gear 76 to mesh therewith. An output shaft 78 extends from the gear 76 through bearings 80 and 82 and a seal 84 located in a bearing carrier housing 86 secured in an opening 88 formed in a wall of the housing 20.

In operation, the relative directions of rotations of the shafts 14, 32, 46 and 78 are as shown by the arrows A (FIG. 2), B (FIG. 1), C (FIG. 1), and D (FIG. 7), respectively.

Referring now to FIG. 8, two double enveloping type worms or pinions 90 and 92 are machined on one input shaft 94, the latter being shown doubly extending and supported at its opposite ends in respective bearings 96 and 98, and seals 100 and 102, in carriers 104 and 106 mounted in a housing 108. The worms 90 and 92 may be machined to different ratios. Also, if desired, the worms may be machined to include right hand and left hand helixes, rather than both right hand or left hand, resulting in different output shaft rotations. Cooperating double enveloping gears 110 and 112 are mounted in the housing 108 so as to mesh with the respective worms 90 and 92, at right angles to each other.

As shown in FIG. 8, a needle bearing 113 is mounted around the shaft 94, between the two worms 90 and 92, and secured in place by oppositely disposed retainer rings 115. The bearings is supported by a web 117 (FIG. 9) formed in the housing 108. This arrangement serves to prevent deflection of the worm shaft 94.

As shown in FIG. 9, the gear 110 is mounted on a shaft 114 which extends in both directions therefrom, through bearings 116 and 118, and seals 120 and 122, in bearings carriers 124 and 126, to thus serve as two output shafts from the housing 108. The gear 112 likewise is mounted on a shaft 128 which extends in both directions therefrom at right angles to the shaft 114, through bearings 130 and 132 and seals 134 and 136, in carriers 138 and 140, serving as two additional output shafts from the housing 108, which may be at a different output speed from the speed of the two output speeds of the shaft 114. Mounting feet 142 formed on the housing 108 serve to mount the assembly on the floor, wall, or ceiling, as desired.

The relative directions of rotation of the respective shafts 94, 114 and 128 are shown by the arrows E, F and G, respectively, but may be of any relative directions of rotation desired, as explained above relative to the selection of the worms 90 and 92 and their respective cooperating gears 110 and 112.

INDUSTRIAL APPLICABILITY

It should be apparent that the invention provides a novel means for obtaining multiple outputs in selected variable directions, as required for various industrial applications, from one double enveloping type or straight cylindrical type pinion or worm. Alternately, different output speeds are available from one given input speed.

It should also be apparent that, while but three general embodiments of the invention, with various modifications thereof, have been shown and described, other modifications are possible.

The embodiments of the invention in which an exclusive property or privilege is claimed are defined as follows:

1. A worm and gear power transmission comprising a housing, an input shaft, two axially aligned, different ratio worms formed on said input shaft in said housing, a pair of gears spaced apart in said housing such that a first gear of said pair meshes with one of the worms, and a second gear of said pair meshes with the other worm, the first and second gears positioned such that planes through said gears and the axis of said input shaft are at a right angle to one another, and output shafts extending out of said housing from said respective gears.

2. The worm and gear power transmission described in claim 1, wherein said output shafts extend in both axial directions out of said housing from each of said respective gears, thereby providing four outputs from a single input.

3. The worm and gear power transmission described in claim 1, wherein each of said worm and gears is of the double enveloping type.

* * * * *